H. MILLER.

Metallic Bird-House.

Patented April 14, 1868.

Witnesses.
Isaac A. Brunell
George Miller

Inventor
Henry Miller

H. MILLER.
Metallic Bird-House.

Patented April 14, 1868.

Witnesses.
Isaac A. Brownell
George Miller

Inventor
Henry Miller

United States Patent Office.

HENRY MILLER, OF CRANSTON, ASSIGNOR TO HIMSELF AHD GEORGE O. MILLER, OF JOHNSTON, RHODE ISLAND.

Letters Patent No. 76,648, dated April 14, 1868.

IMPROVEMENT IN METALLIC BIRD-HOUSE.

The Schedule referred to in these Letters Patent and making part of the same.

TO ALL WHOM IT MAY CONCERN:

Be it known that I, HENRY MILLER, of the town of Cranston, in the county of Providence, and State of Rhode Island, have invented a new Manufacture of an Ornamental Metallic Bird-House for gardens, lawns, &c.; and I do hereby declare that the following is a full, clear, and exact description of the same, reference being had to the accompanying drawings, making part of this specification, in which—

Similar letters refer to like parts in all the figures.

The ornamental bird-house herein set forth is generally erected or placed in gardens, upon lawns, or attached to dwelling-houses, for the accommodation and abode of swallows, martens, wrens, blue-birds, and other varieties, to induce them to make their abode near the dwelling of man, for the sake not only of their enlivening song, but for the destruction of the large quantities of obnoxious insects which they devour during their breeding season, not only as food for themselves but for their young, and which are thus prevented from injuring the foliage and growing shrubs and plants in the garden or its vicinity. The presence of the birds being thus secured, is obviously of incalculable value for this purpose.

Heretofore the bird-house, in its rudest form, has been a simple box, with a hole for the entrance and exit of the bird, and perhaps a shelf or perch without, to facilitate the entrance of the old bird, or the final departure of the young when they have attained sufficient strength to venture forth on wing. Others, and those of a more ornamental character, are generally of wood, and are constructed with great elaboration and corresponding expense; sometimes as a miniature of the residence or dwelling to the grounds of which it is intended as an embellishment, and otherwise of any fanciful design or form.

All designs for ornamental bird-houses thus wrought out of wood, are necessarily very expensive, and at the same time, in consequence of their exposure to the weather, very perishable, and require frequent repairs and painting, to preserve them in their original form and appearance. Such being the case, it is the object of my invention to produce the ornamental bird-house in a variety of elaborate designs that will be comparatively imperishable or unaffected by exposure to the weather, and at the same time less expensive than the wooden bird-houses now generally used.

My invention, to this end, consists of a bird-house, cast, of metal, in a variety of ornamental designs, or as hereinafter described.

Figure 1:
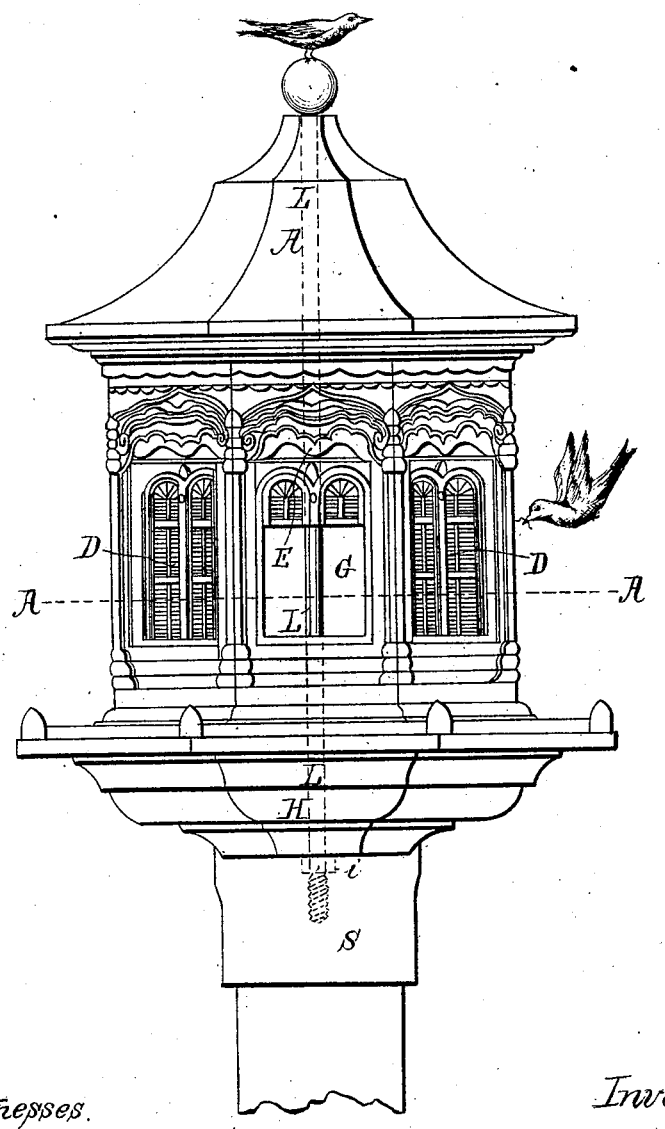
Figure 1 is a front elevation of one pattern or design of my improved bird-house.
Figure 2:
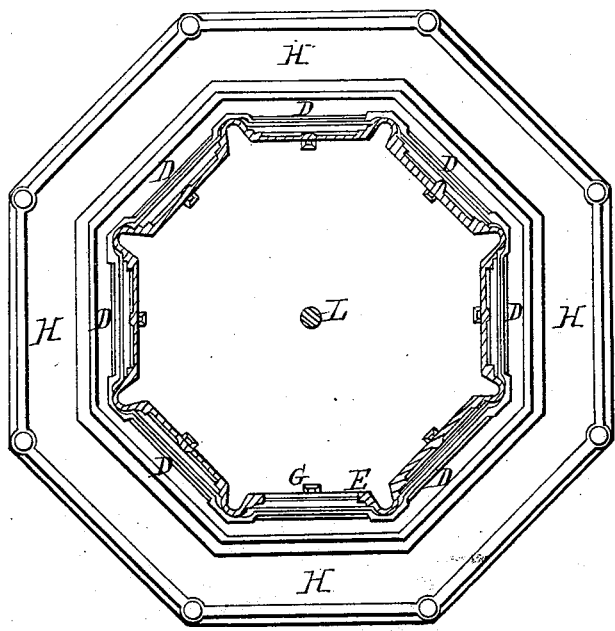
Figure 2 is a plan of a section through the line A A of fig. 1.

In the drawings, figs. 1 and 2 represent such an ornamental bird-house of metal. In fig. 1, the bird-house represented is of cast iron, and, being octagonal in form, has its sides D D cast in separate pieces from the same pattern, suitably ornamented, with the front piece E of another pattern corresponding to D D, but with an opening or entrance at G. The top, A, and the bottom, H, are cast each in one piece, and all the pieces are fitted together, and the whole structure secured by the bolt L, passing from the top through the centre, and with a screw-nut, $i$, underneath, as shown in dotted lines. Upon the bottom piece H there may be formed a socket or sleeve, S, to receive the tip of the pole upon which the bird-house is placed or elevated from the ground.

It will be obvious that the plates of cast iron, of which the bird-house is formed as set forth, may be quite thin, and ornamented as shown ; also that from one set of patterns of such set of plates, after once made, many castings may be produced by simply moulding the same in the usual way from iron, or of lead, zinc, brass, or other metal, whereby, after the patterns have been produced of one design, so many bird-houses may be produced, and of a highly ornamental shape, as to reduce the expense of the bird-house to quite an insignificant sum compared with the cost of a similar structure of wood.

*Claim.*

What I claim as my invention, and desire to secure by Letters Patent, is—

The metallic bird-house, constructed substantially as described, as a new article of manufacture.

HENRY MILLER.

Witnesses:
ISAAC A. BROWNELL,
GEORGE MILLER.